United States Patent [19]

Feldhaus

[11] Patent Number: 5,588,518
[45] Date of Patent: Dec. 31, 1996

[54] CLUTCH DISC WITH A REINFORCED HUB

[75] Inventor: Reinhard Feldhaus, Ebenhausen, Germany

[73] Assignee: Fichtel & Sachs AG, Schweinfurt, Germany

[21] Appl. No.: 400,365

[22] Filed: Mar. 8, 1995

[30] Foreign Application Priority Data

Mar. 9, 1994 [DE] Germany ............... 44 07 766.1

[51] Int. Cl.⁶ ................ F16D 13/68; F16D 3/12
[52] U.S. Cl. .............. 192/204; 192/213.12; 464/68
[58] Field of Search ................. 192/200, 204, 192/206, 207, 212, 213, 213.1, 213.11, 213.12, 213.2, 213.21, 213.22, 213.3, 213.31, 214, 214.1; 464/68

[56] References Cited

U.S. PATENT DOCUMENTS 4,461,376   7/1984   Lech, Jr. et al. .......... 192/206
5,117,959   6/1992   Graton .
5,251,736   10/1993  Jeppe et al. ............. 192/204

FOREIGN PATENT DOCUMENTS 0086044   8/1983    European Pat. Off. .
0093176   11/1983   European Pat. Off. .
0586290   3/1994    European Pat. Off. .
2237357   5/1991    United Kingdom .

*Primary Examiner*—Richard M. Lorence
*Attorney, Agent, or Firm*—Nils H. Ljungman and Associates

[57] ABSTRACT

A clutch disc with a torsion damping device for low torques and a torsion damping device for large torques, in which the input part or the output part of one of the two torsion damping devices, with an essentially tubular extension which runs axially, is placed on a cylindrical guide diameter of the hub which is oriented concentrically to the axis of rotation. The extension is thereby used to stabilize the hub in the radial direction when torque is applied.

19 Claims, 6 Drawing Sheets

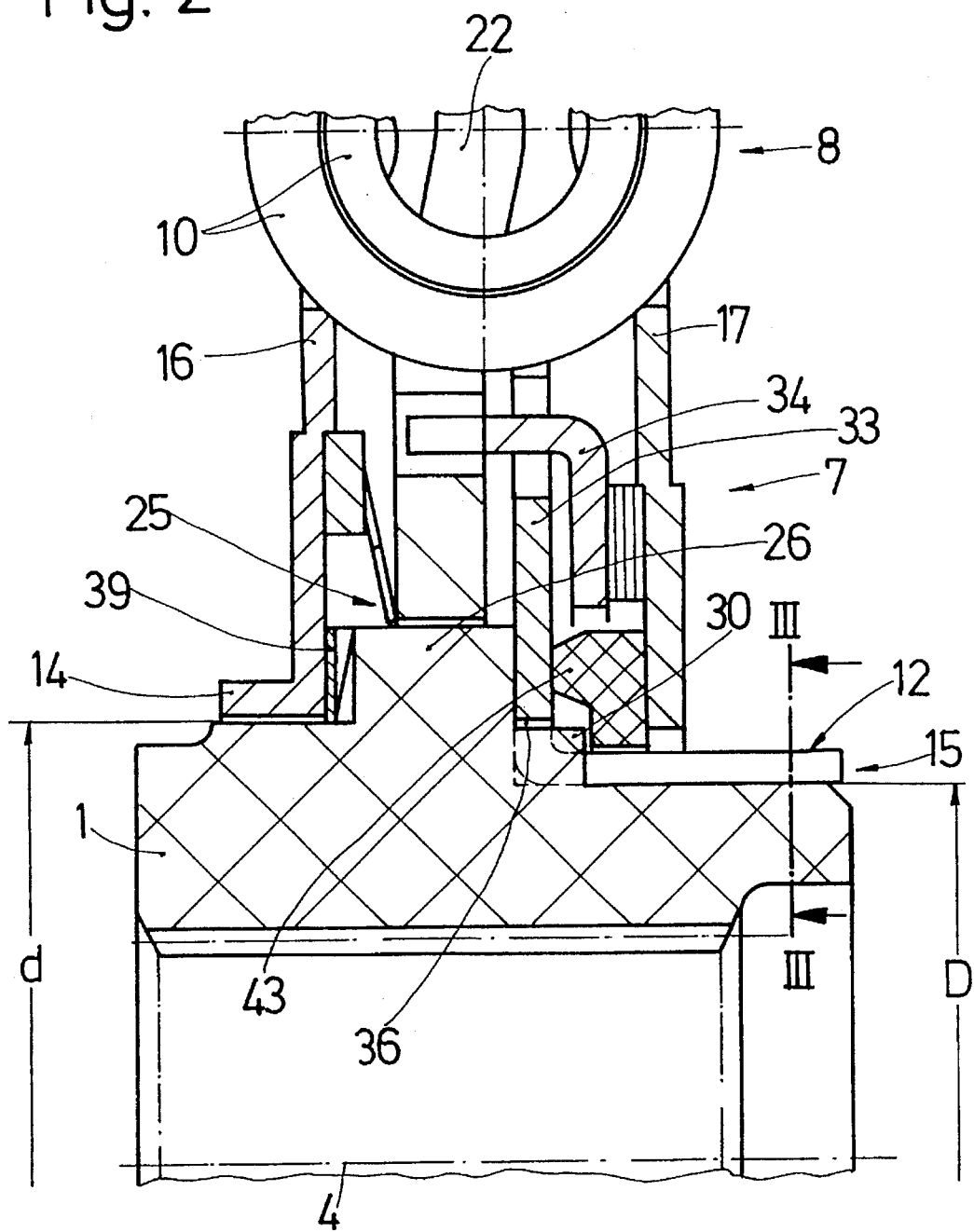
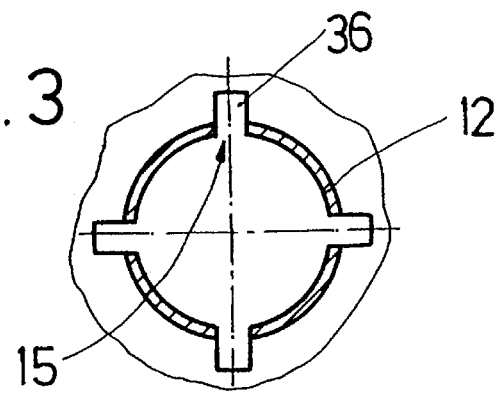

VI - VI 5,588,518

CLUTCH DISC WITH A REINFORCED HUB

BACKGROUND OF THE INVENTION

1. Field of the Invention

The present invention generally relates to a clutch disc for a friction clutch in a motor vehicle, the friction clutch comprising a hub with internal gearing for its non-rotational mounting on a transmission shaft, a lining holder with friction linings located on both sides, and torsion damping devices actively located between the hub and the lining holder. The first torsional damping device is designed for low torques and, when viewed in the radial direction, is located relatively close to the hub. The first torsional damping device includes at least one input part and at least one output part, the at least one output part being rotatable against the force of springs concentrically in relation to a common axis of rotation. The second torsional damping device is designed for higher torques and is actively connected to the first.

2. Background Information

A clutch disc of the type described above is disclosed, for example, in European Patent 00 86 044. On this known clutch disc, hubs made of different materials are used which, when viewed in the radial direction, are relatively thin-walled in places, starting from the gearing which represents the means for mounting the hub on the transmission shaft. On these clutch discs with relatively thin-walled hub parts, or on hubs made of plastic, there can often be a danger that, at high torques or peak torques, the hubs will be deformed radially outward by means of their hub gearing. In the event of plastic deformation, the hub can essentially be damaged or destroyed.

OBJECT OF THE INVENTION

An object of the present invention is to improve the design of a clutch disc so that the hub is better protected against excessive deformation.

SUMMARY OF THE INVENTION

The invention teaches that this object can be accomplished by means of an arrangement in which the input part or output part of one of the two torsion damping devices is placed by means of an axial, essentially tubular extension on a cylindrical guide diameter of the hub, which guide diameter is preferably oriented concentrically with respect to the axis of rotation.

Because the input part or output part of one of the two torsion damping devices is placed by means of an essentially tubular extension which extends axially on a cylindrical guide diameter of the hub, which guide diameter is oriented concentrically to the axis of rotation, it can be guaranteed that excessive and undesirable radial expansion of the hub can be prevented. More economical manufacturing becomes possible as a result of the configuration of the tubular extension as a portion of an input part or of an output part of one of the two torsion damping devices. No additional components are therefore essentially necessary. The hub can thereby be made relatively thin-walled in the vicinity of the tubular extension.

With regard to an additional feature of the present invention, according to at least on preferred embodiment, it is contemplated herein that it can be advantageous to use a material, for the input part or for the output part, which has a modulus of elasticity higher than that of the material used to manufacture the hub. For the input part or the output part, steel in particular can be suitable, while the hub can be injection-molded from aluminum, for example. The manufacture of the hub thereby can become a relatively simple process, since the gearing which would need to be introduced into the hub during the manufacturing process, such as by injection molding, can be created in a single work step.

An additional feature of the present invention, according to at least one preferred embodiment, is that the hub is preferably made of plastic. When a plastic part is used for the hub, it becomes possible, by means of the manufacturing process, such as injection molding, to obtain a component which requires relatively little cutting or machining, whereby, simultaneously, the tubular extensions can guarantee that, when torque is exerted on the clutch disc, this hub is essentially restricted in its radial movement so that virtually no undesirable expansion can occur. Further, when plastic is used as the material for the hub, it can become possible to manufacture complex shapes relatively easily, while, in known arrangements, there was typically a risk that, as a result of uneven radial rigidities of the hub, viewed in the axial direction, an uneven radial expansion could lead to local overloads. As a result of the configuration contemplated by at least one preferred embodiment of the present invention, these local overloads can be counteracted, and it is possible to improve the efficient utilization of the material used to manufacture the hub, e.g. so that protective extensions need only be provided at the points which are subject to the greatest load. As a result of a configuration contemplated by at least one preferred embodiment of the present invention, it is also possible to introduce the torque into the hub severely eccentrically. The result is a greater freedom of design with regard to the location of essentially all of the components of the clutch disc.

On a clutch disc in which: the second torsion damping device includes two cover plates located on either side of a hub disc, and wherein one of the cover plates is connected radially outwardly with friction linings, the two cover plates being non-rotationally connected to one another and held at a distance from one another and being guided so that they can rotate concentrically in relation to the hub, the hub disc being rotationally connected to the hub by means of gearing with clearance, such as external gearing and/or internal gearing, the hub disc and cover plates locating springs in apertures, the first torsion damping device being located axially between the hub disc and a cover plate, and having a cover plate as the input part and a hub disc as an output part, and their springs: the present invention teaches that the hub disc of the first torsion damping device is preferably permanently connected to the hub; preferably has a disc-shaped area with apertures for springs, a sleeve-shaped extension extends from its inside diameter and points axially away from the hub disc of the second torsion damping device, by means of which extension it is placed on a cylindrical guide diameter of the hub.

By means of such a design, it can be possible to provide a radial reinforcement of the hub in a diameter area radially inward from the opening in the cover plates, which, in practical terms, is essentially formed by an existing component of the first torsion damping device. The hub disc is thereby provided with an integral, sleeve-shaped extension essentially only in the vicinity of its inside diameter, which extension sits on a cylindrical guide diameter of the hub and thereby prevents a radial expansion of the hub.

The hub disc can thereby be advantageously designed so that, with its disc-shaped area, it is preferably in contact with the one end surface of the external gearing of the hub.

Further, the hub in this area preferably has axially projecting lugs which are engaged in corresponding openings in the hub disc circumferentially, essentially without play. As a result of this arrangement, it is essentially guaranteed that, in a simple manner, a non-rotational connection is created between the hub disc and the hub.

The lugs can thereby be advantageously located in the corner area between the end surface of the external gearing and the guide diameter of the hub, and the openings in the hub disc can preferably proceed from the disc-shaped area and extend in the form of slots which run axially over the full length of the extension. Such a configuration may essentially be particularly uncritical with regard to the manufacturing tolerances between the guide diameter of the hub and the inside diameter of the tubular extension. The terminal area of the axial slots can simultaneously be used for the transmission of torque with respect to the lugs. But it is also possible to locate the lugs radially outward from the extension, whereby they can form, with their end surfaces, a circumferentially discontinuous stop, or contact, and friction surface for the cover plate of the second torsion damping device, i.e. for the cover plate which faces these ends. These lugs therefore can perform a dual function, namely the non-rotational connection of the hub disc to the hub, and also the formation of a stop and friction surface for the cover plate of the second torsion damping device. The number of individual parts required can therefore be reduced.

To generate a friction force, a spring which acts axially is preferably advantageously provided on the end surface of the external gearing of the hub, opposite the end surfaces of the extensions, which spring acts on the cover plate of the same side. A basic friction effect is therefore achieved with a very low number of individual parts.

As contemplated by an additional embodiment of the present invention, it can also be advantageous if a cover plate of the second torsion damping device on the side of the external gearing facing away from the extension of the hub disc of the first torsion damping device is placed by means of an integral, and essentially tubular, extension which runs axially onto a cylindrical guide diameter of the hub, which guide diameter is oriented concentrically to the axis of rotation. Thus there can also be protection against an undesirable expansion of the hub on the side of the hub facing away from the extension of the hub disc of the first torsion damping device. As a result of this design, the hub can be kept radially rigid essentially over its entire axial extension.

As contemplated by an additional embodiment of the present invention, the outside diameter of the extension of the hub disc of the first torsion damping device can simultaneously be used as a guide for the cover plate of the second torsion damping device, i.e. for the cover plate located on this side. For this purpose, the cover plate, in the vicinity of its inside diameter, is preferably provided with a bearing element which is rotationally mounted on the outside diameter of the extension. It can thus be guaranteed that at this point, there is a suitable pair of materials for the mounting of the cover plates on the hub. The extension of the hub disc can thereby essentially perform a dual function, i.e. it can protect the hub and guide the cover plates.

On a clutch disc as contemplated by at least one preferred embodiment of the present invention, the second torsion damping device can be formed by two cover plates located one on either side of a hub disc, one of which is provided radially outwardly with friction linings. Both cover plates are preferably non-rotationally connected to one another, are held at a distance from one another, and are guided so that they can rotate concentric to the hub. The hub disc is preferably rotationally connected with clearance to the hub by means of gearing, such as external gearing or internal gearing, and the hub disc and cover plates preferably serve to locate springs in apertures. The first torsion damping device is preferably located essentially centrally in relation to the hub disc of the second torsion damping device, such that the springs of the first torsion damping device are preferably located in the vicinity of the gearing between the hub disc and the hub, and, on both sides of the gearing, cover plates are preferably provided as output parts for the actuation of the springs.

According to a preferred embodiment of the present invention, the hub, in the vicinity of the gearing with teeth which point outward, can be provided with an external gearing which is narrower than the diameter of the springs of the first torsion damping device. Further, on both sides of the teeth there can be cover plates which have a disc-shaped area for the springs, which are non-rotationally mounted on the hub, which have apertures directed axially toward the springs in which the springs are engaged. From the inside diameter of at least one of these disc-shaped areas, a sleeve-shaped extension can initiate, which then extends away from the gearing and is placed on a cylindrical guide diameter of the hub.

As a result of this design, at least one of the cover plates can essentially have a dual function. This dual function can include, on one hand, actuating the springs by means of the disc-shaped area and the apertures located in it. On the other hand, the dual function can include stabilizing the hub radially inwardly by means of the sleeve-shaped extension. This design is therefore very compact and economical, on account of the small number of individual parts required. In one particularly favorable embodiment, on both sides of the teeth of the external gearing, there can be cover plates for the first torsion damping device, each of which preferably has a sleeve-shaped extension for the stabilization of the hub. The hub can thereby be stabilized symmetrically to its gearing, and a relatively thin-walled design can be realized.

The non-rotational connection of the cover plates can thereby be advantageously achieved if the teeth are provided with lugs which project axially and are engaged in corresponding openings of the disc-shaped areas of the cover plates with essentially no circumferential clearance. These lugs are thereby preferably located radially outward from the springs, so that the space can be used particularly efficiently for the installation of the springs in the circumferential direction.

In a particularly advantageous manner, at least one sleeve-shaped extension of a cover plate can thereby be used for the radial guidance of the cover plates of the second torsion damping device. For this purpose, the cover plate can be provided, in its radially inward area, with a bearing element which is placed on the cylindrical outside surface of the extension. Because the bearing element can preferably be made of plastic, the result can be a favorable material pair.

The bearing element can thereby be in contact simultaneously with the disc-shaped area of the corresponding cover plate of the first torsion damping device, and can be held in controlled contact by means of the friction stress as a result of the location of a spring which acts axially on the opposite side.

On a clutch disc in which the second torsion damping device includes two cover plates located one on each side of a hub disc, one of which is connected radially outwardly with friction linings, the two cover plates can be non-rotationally connected to, and held at a distance from, one another, and can be rotationally guided concentrically to the hub. Between the two cover plates, there is preferably a hub disc which is rotationally connected to the hub by means of gearing essentially without clearance, and the hub disc and cover plates preferably located springs in apertures. The first torsion damping device is preferably oriented essentially centrally in relation to the hub disc of the second torsion damping device, such that the springs of the first torsion damping device are located essentially radially outside the gearing between the hub disc and the hub, and on both sides of the gearing there are preferably cover plates to actuate the springs.

Additionally, in accordance with another preferred embodiment of the present invention, the cover plates of the first torsion damping device can be designed in one piece with the cover plates of the second torsion damping device, so that the cover plates, in addition to the apertures for the springs of the second torsion damping device, can have additional apertures which are designed to actuate the springs of the first torsion damping device. At least one of the cover plates is preferably provided radially inward of the apertures with an integral sleeve-shaped extension which points away from the gearing, and by means of which it is guided on a guide diameter of the hub. The result of these measures is a particularly simple design for a clutch disc with idle dampers and load dampers, which requires very few individual parts, and on which the hub is protected against expansion in the radial direction. The small number of individual parts results from the fact that the cover plates actuate both the springs for the two torsion damping devices, and at least one of the cover plates is simultaneously provided in its radially inward area with its integral, sleeve-shaped extension. In particular, when plastic is used as the material for the hub, the result can be a favorable pairing of materials with a relatively low coefficient of friction at the guide point.

The cover plate can thereby be supported approximately in the vicinity of the diameter of the extension axially on the external gearing of the hub, and can be pushed away from the gearing on the opposite side of the other cover plate, with the interposition of an axially acting spring between the external gearing and the inside of the cover plate. By means of this device, it is possible to set a controlled basic friction.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any ay admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

In summary, one aspect of the invention resides broadly in a clutch disc for a motor vehicle clutch, the clutch disc comprising: first cover plate means; second cover plate means; means for substantially fixedly connecting the first and second cover plate means with respect to one another; hub means; the hub means having means for connecting with a transmission of a motor vehicle; at least one torsional damper means for damping torsional vibrations; the torsional damper means comprising: an input portion; an output portion; means for transmitting a torsional force from the input portion to the output portion; means for stiffening the hub means so as to inhibit plastic deformation of the hub means; and the stiffening means comprising a portion of at least one of the input portion and the output portion of the torsional damper means.

BRIEF DESCRIPTION OF THE DRAWINGS

The invention is explained in greater detail below with reference to several embodiments which are illustrated in the accompanying drawings, wherein:

FIG. 2 is a partial longitudinal section through a clutch disc, on an enlarged scale;

FIG. 3 illustrates a cross section along Line III—III in FIG. 2;

DESCRIPTION OF THE PREFERRED EMBODIMENT

Figure 1:
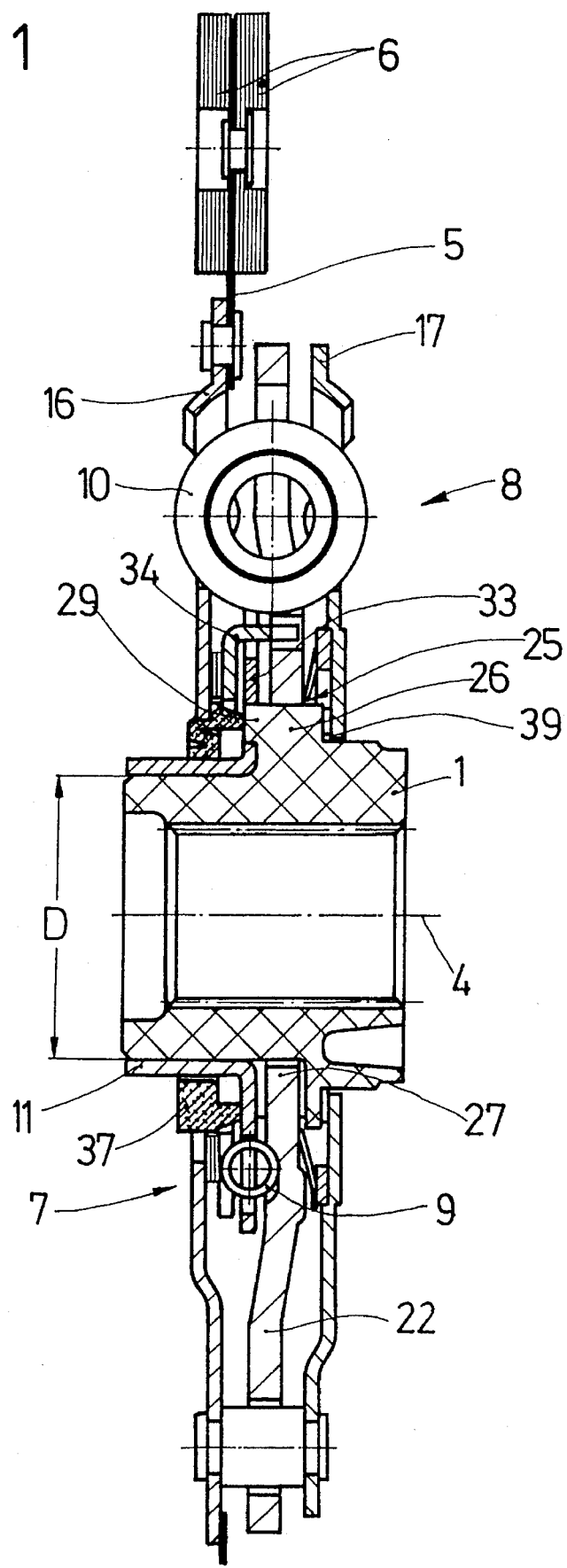
FIG. 1 is a longitudinal section through a clutch disc.
Figure 1A:
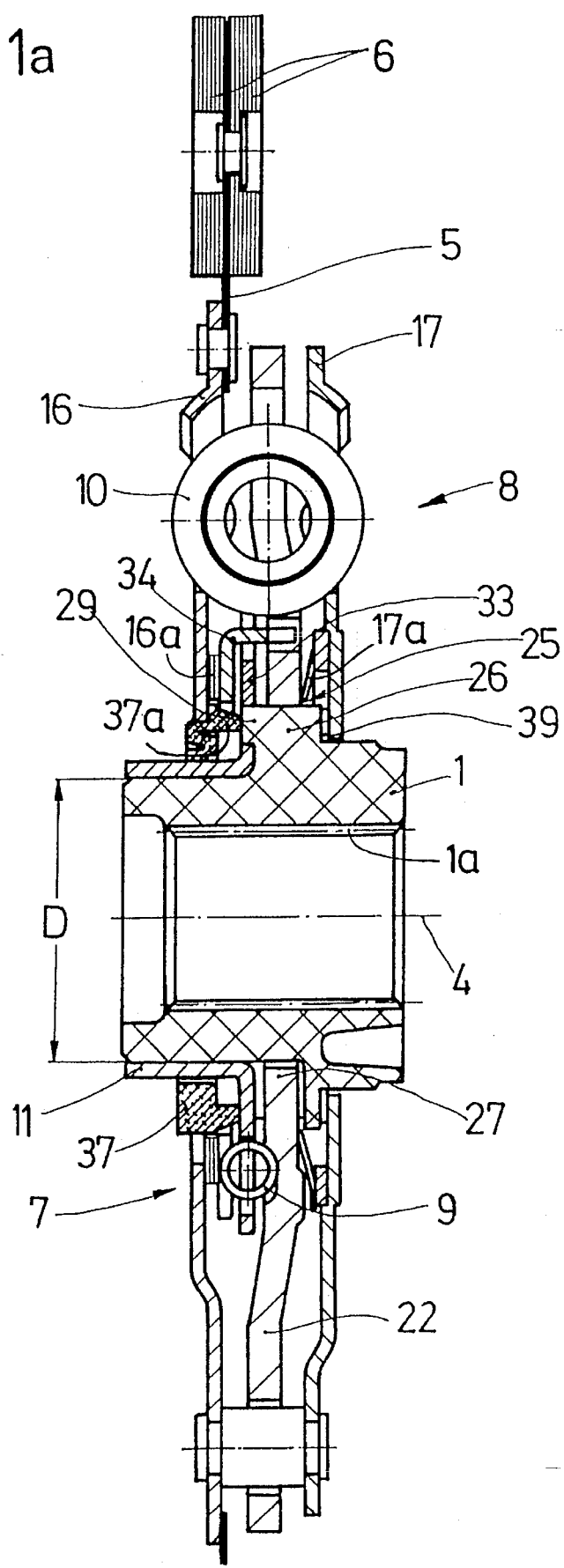
FIG. 1a is substantially the same view as FIG. 1, but more detailed.

FIG. 1 shows a longitudinal section through an essentially complete clutch disc. Concentric to an axis of rotation 4 is a hub 1 which, in a hole, has a gearing 1a (see FIG. 1a) for a non-rotational placement on a transmission shaft (not shown). The hub 1 is preferably made of plastic, but it is also possible to use another material, e.g. aluminum. In the vicinity of its outside diameter—approximately in the center of its axial extension—the hub 1 has external gearing 26 which is non-rotationally engaged wit a hub disc 22 with corresponding internal gearing 27, with clearance in the circumferential direction. This gearing 25 (external gearing 26 and internal gearing 27) is used to define the action of the first torsion damping device 7 for the idle range. This first torsion damping device 7 preferably includes a hub disc 33 located laterally next to the hub disc 22 of the second torsion damping device 8 for the load range, which hub disc 33 is non-rotationally connected to the hub 1 and has apertures for the location of springs 9. Laterally next to the hub disc 33, at least on the side away from the hub disc 22, there is a cover plate 34 which also has apertures for the actuation of the springs 9. The function of the additional cover plate, which is conventionally located on the opposite side of the hub disc 33, is taken over by the hub disc 22 of the second torsion damping device 8. The cover plate 34 is thereby non-rotationally connected to the hub disc 22 by means of axially-bent lugs. The hub disc 33, in its radially inward area, has a preferably integral, axial extension 11, by means of which it is placed on a guide diameter D concentrically to the axis of rotation 4 on the hub 1. The hub disc 33 with its extension 11 is preferably made of steel, and has a modulus of elasticity which is higher than the modulus of elasticity of the material used to manufacture the hub. It can essentially be thereby guaranteed that the hub, when it is subjected to high torque stress, will be prevented from expanding undesirably in the radial direction with respect to the transmission shaft as a result of the forces exerted on its gearing. The second torsion damping device 8 can preferably include two cover plates 16 and 17, one on either side of the hub disc 22, which are non-rotationally connected to and held at a distance from one another, and one of which is connected radially outwardly by means of lining holders 5 to friction linings 6. The torsion damping device 7 for the idle range is preferably located in the axial space between the hub disc 22 and the cover plate 16, and radially inward from the springs 10 for the load range. The cover plate 16 is also provided in the vicinity of its inside diameter with a bearing element 37 which is rotationally mounted on the outside diameter of the extension 11. Each of the two torsion damping devices 7 and 8 can also preferably have a friction device which, in the case of the second torsion damping device 8, includes at least one friction element 16a (see FIG. 1a) between the cover plate 16 and the cover plate 34, and of a spring 17a (see FIG. 1a) which is located between the cover plate 17 and the hub disc 22. The friction device for the first torsion damping device 7 preferably includes an axially-directed extension 37a (see FIG. 1a) of the bearing element 37, which is in contact with axially-oriented lugs 29 of the external gearing 26 of the hub 1, and of a spring 39 which is stretched between the opposite cover plate 17 and the external gearing 26. The lugs 29 of the external gearing 26 are engaged by means of corresponding openings in the hub disc 33, essentially without clearance in the circumferential direction, and can thus create a non-rotational connection between the hub disc 33 and the hub 1. This non-rotational connection can make it possible to place the hub disc 33 by means of its extension 11, e.g. by means of a close sliding fit, on the guide diameter D of the hub 1, whereby the manufacturing tolerances of the individual cylindrical guide surfaces are relatively uncritical and the assembly process is much easier.

FIGS. 2 and 3 illustrate a variant of the embodiment illustrates in FIG. 1. The partial longitudinal section illustrated in FIG. 2 shows the torsion damping devices 7 and 8 of a clutch disc with a hub 1, e.g. a hub made of plastic. In the vicinity of its outside circumference, the hub 1 has external gearing 26, which is part of a gearing 25 between the hub disc 22 and the hub 1. The external gearing 26 is thereby axially wider than the hub disc 22. On either side of the hub disc 22 there are cover plates 16 and 17, whereby all three parts are provided with apertures for the location of springs 10 for the torsion damping device. 8. The torsion damping device 7 for the idle range is located in the axial space between the hub disc 22 and the cover plate 17. This torsion damping device 7 preferably includes a hub disc 33 which is non-rotationally connected to the hub 1, and has the apertures for the location of springs 9, as illustrated in FIG. 1. On both sides of the hub disc 33 there are cover plates, one of which is designated 34 and the other of which is formed by the hub disc 22. In both parts, there are also apertures or openings for the actuation of the springs 9. The cover plate 34 is thereby non-rotationally connected to the hub disc 22. The hub disc 33 is axially in contact from the right side with the external gearing 26, and in its radially inward portion is provided with an integral cylindrical extension 12 which is preferably radially guided on a guide diameter D of the hub 1. The extension 12 is thereby preferably provided with slots 15 which run axially, which are engaged with their terminal areas facing the hub discs 22 non-rotationally in lugs 30. Lugs 30 are preferably integrally located on the hub 1.

The cross section along line III—III in FIG. 2 thereby shows the location of the extension 12 and of the slots 15. The slots 15 can thereby end in the vicinity of the hub discs 33 in openings 36 which surround the lungs 30 without clearance in the circumferential direction. The extension 12 stabilizes the hub 1 in the vicinity of the guide diameter D and, when high torques are transmitted by the torsion damping device 8 to the hub 1, prevents a radial expansion of the hub 1. FIG. 2 also shows that the cover plate 16, for its own guidance and for the guidance of the components rigidly connected to it in relation to the hub 1, can preferably be provided with an integral, axially-oriented extension 14, which points away from the gearing 25 and is placed on a guide diameter d of the hub 1. This extension 14 is also capable of keeping the shape of the hub 1 stable in the vicinity of the guide diameter d in the radial direction. In the vicinity of the torsion damping device 7, the figure shows a load friction device which consists of a friction ring between the cover plate 34 and the cover plate 17, and a spring between hub disc 22 and the cover plate 16. It is thereby assumed that the cover plate is also axially supported on the hub disc 22 by means of axially-bent lugs, by means of which it is non-rotationally connected to the hub disc 22, for the transmission of the axial force required to generate the friction force. There is also a basic friction device which includes a support element 43, which is located axially between the inside wall of the cover plate 17 and the hub disc 33, and an axially acting spring 39, on the side facing away from the torsion damping device 7 of the gearing 25, which is supported between the inside wall of the cover plate 16 and the external gearing 26.

The general function of this clutch disc—which also essentially applies for FIG. 1—is such that when low torques are introduced via the friction linings, 6, the torsion damping device 8, as a circumferentially rigid component in the vicinity of the circumferential clearance of the gearing 25, can execute a rotation against the force of the springs 9 of the torsion damping device 7, and against the friction force of the springs 39 and of the support element 43. In response to a higher torque, when the clearance in the gearing 25 is overcome, the torsion damping device 7 can essentially lock and the hub discs 22 can essentially come to a standstill in relation to the hub 1, while the cover plates 16 and 17 execute a further rotation, against the force of the springs 10 of the torsion damping device 8. Both friction devices can essentially be considered as being active when this higher torque is present.

Figure 4:
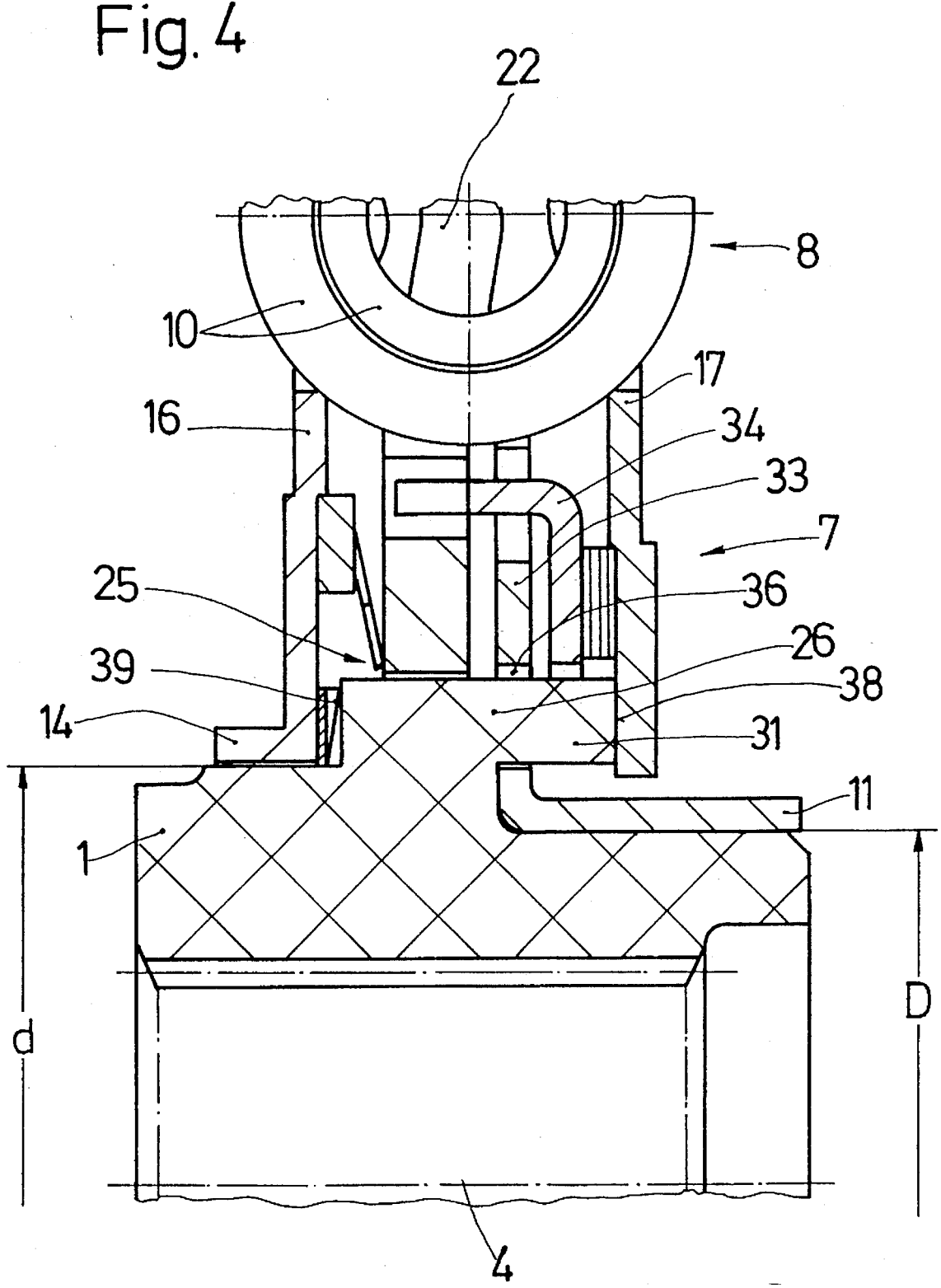
FIG. 4 is a partial section on an enlarged scale through another design.

The design illustrated in FIG. 4 differs from the design illustrated in FIG. 2 essentially only in a few points, and only the differences will be discussed here. The clutch disc 1 is provided in the vicinity of its external gearing 26 with axially projecting lugs 31 which run at a radial distance from the guide diameter D of the hub 1. The hub disc 33 of the torsion damping device 7 sits with its axially projecting cylindrical extension 11, the circumference of which is continuous, on the guide diameter D. The hub disc 33, corresponding to the lugs 31, has openings 36 in which the lugs 31 are engaged without clearance. In the axial direction, pointing away from the external gearing 26, the lugs 31 are extended so that their end surfaces running circumferentially form a contact, or stop, and friction surface 38, against which the inside of the cover plate 17 of the torsion damping device 8 is in contact. At this point, the basic friction is generated in connection with the spring 39 which is located on the side opposite the stop and friction surface 38 of the external gearing 26 opposite the inside of the cover plate 16. As a result of this design, the complexity and expense of the construction can be reduced, since the lugs 31 of the gearing 26 simultaneously form a friction surface and an axial stop for the cover plate 17, and a separate component is essentially not necessary.

Figure 5:
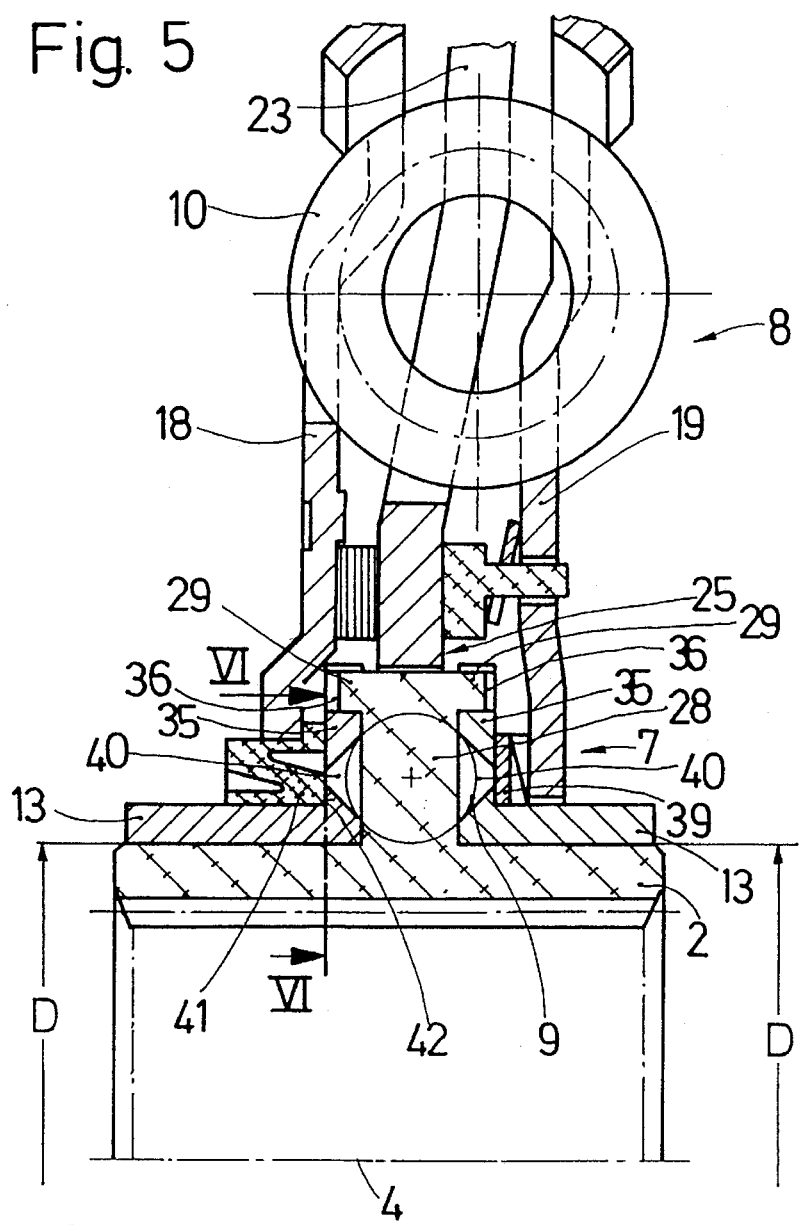
FIGS. 5 and 6 are respectively a partial section and a partial view through a variant.
Figure 6:
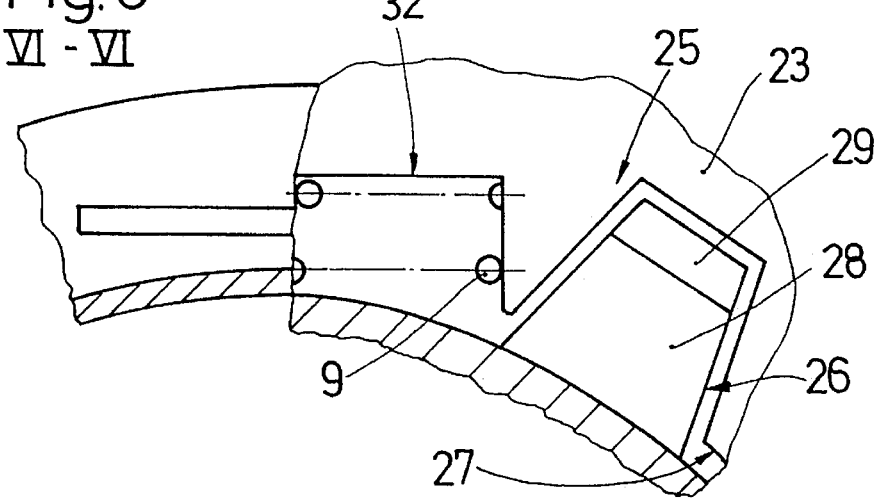

The design illustrated in FIGS. 5 and 6 differs from the designs described previously in that the torsion damping device 7 for the idle range is located inside the gearing 25 between the hub disc 23 and the hub 2. For this purpose, circumferentially between the teeth 28 of the external gearing 26 of the hub 2, there is a corresponding space for the location of apertures 32, into which the springs 9 of the torsion damping device 7 are inserted. The corresponding internal gearing of the hub disc 23 is designated 27, and a cover plate 35 is in contact from both axial sides with the teeth 28 of the external gearing 26, which cover plates 35 has apertures or recesses 40 for the actuation of the springs 9. The teeth 28 of the gearing 25 can thereby be narrower than the diameter of the springs 9, so that the springs project on both sides of the apertures 32. In this area, they are engaged in the apertures 40 of the cover plates 35. Each cover plate 35, in the area radially inward from its disc-shaped portion, is provided with a sleeve-shaped extension 13 which points away from the gearing 25. This sleeve-shaped extension 13 is placed on a guide diameter D of the hub 2. The two extensions 13 stabilize the hub 2 in the radial direction for the transmission of high torque. Since in this design, the cover plates 35 act as output parts for the torsion damping device 7, they are non-rotationally connected to the hub 2. For this purpose, radially outward from the springs 9, they have openings 36 into which the axially projecting lugs 29 of the teeth 28 of the external gearing 26 are engaged essentially without play in the circumferential direction. The diameter of the cover plate 19 of the torsion damping device 8 is reduced radially inward practically to the extension 13, while the opposite cover plate 18 is connected in the vicinity of its inside diameter with a bearing element 41, which is placed on the outside diameter of the extension 13 of the cover plate 35, where it provides guidance. The bearing element 41 thereby has a surface 42 which runs perpendicular to the axis of rotation 4, and is in contact against the cover plate 35 to provide axial guidance and to generate a basic friction in connection with a spring 39, which is located on the opposite side between the inside of the cover plate 19 and the other cover plate 35. In the vicinity of the torsion damping device 8, there is also a load friction device which is active between the two cover plates 18 and 19 and the hub disc 23.

Figure 7:
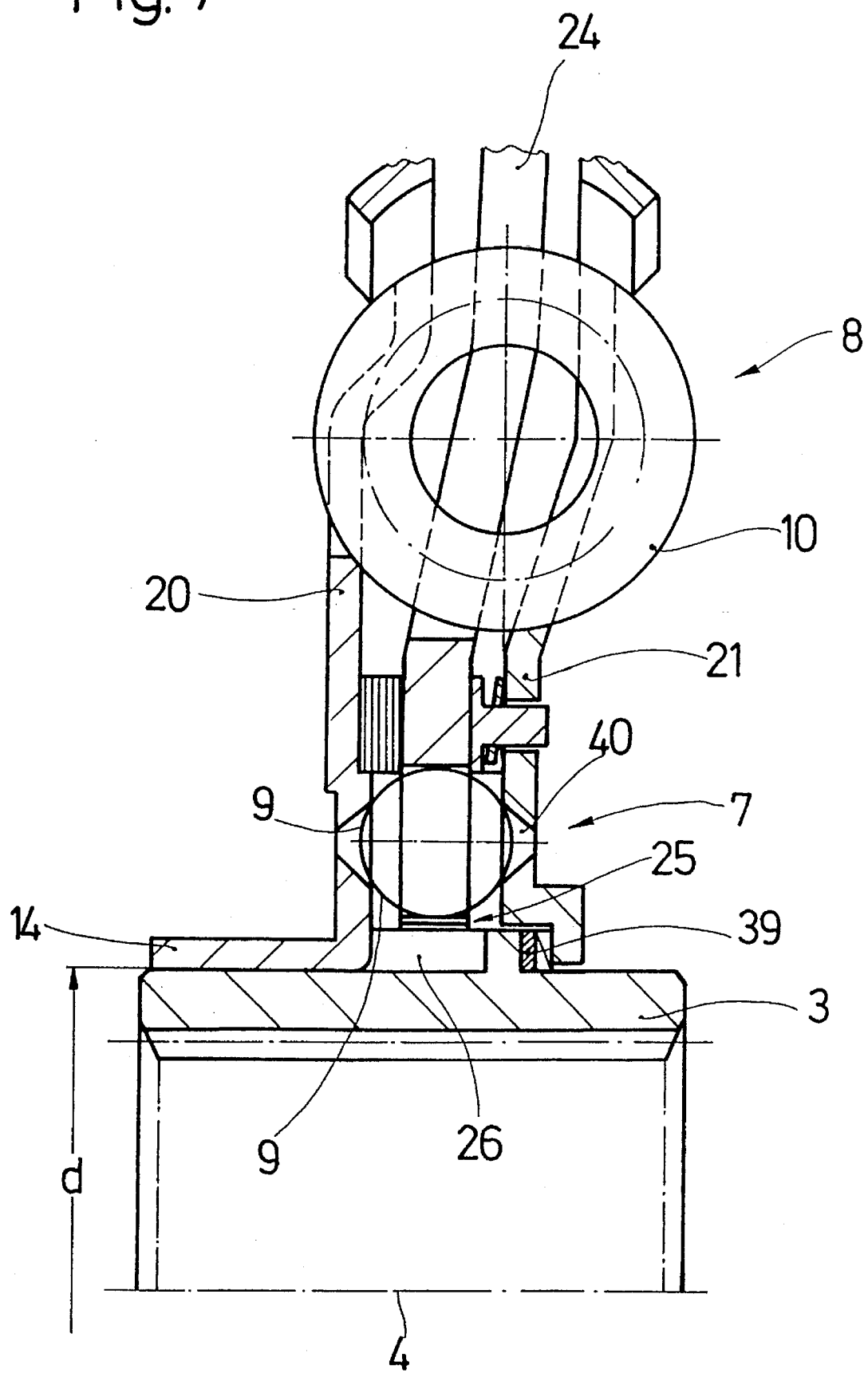
FIG. 7 is a partial section on an enlarged scale through an additional embodiment.

FIG. 7 illustrates a design in which the torsion damping device 7 is also located centrally in relation to the hub disc 24 and radially outside the gearing 25, whereby the gearing 25 has no clearance in the circumferential direction. The two cover plates 20 and 21 of the torsion damping device 8 are designed so that they pressurize not only the springs 10 of the torsion damping device 8 for the load range, but also the springs 9 for the torsion damping device 7 of the idle device. The diameter of the springs 9 is also designed, with regard to the axial extension of the hub disc 24, so that the springs 9 project outward in both axial directions, and in this area are engaged in apertures 40 of the cover plates 20 and 21 for actuation. The one cover plate 20 is thereby designed in its radially inner area with a cylindrical and integral extension 14 which runs axially, whereby this extension 14 is placed on a guide diameter d of the hub 3. This extension 14 guides the torsion damping device 8 with respect to the hub 3 in the radial direction, and simultaneously provides radial support for the hub 3 in the event of the transmission of high torque. The axial guidance of the two cover plates 20 and 21 is realized by the external gearing 26 of the hub 3 and by the radially inward regions of the cover plates 20 and 21. Between the one cover plate and the external gearing 26 there can thus be a spring 39, which brings the opposite cover plate into contact with the external teeth 26, to generate a basic friction. The general function of the torsion damper illustrated in FIG. 7 is thereby as follows:

When torque is introduced by means of the cover plates 20, 21 during idle operation, the springs 9 are immediately actuated, since the gearing 25—provided, for example, for manufacturing reasons—has no clearance in the circumferential direction. The springs 10 correspond with apertures which are made either in the cover plates 20, 21 or in the hub disc 24 circumferentially larger by the range of action of the idle damping device 7. When this range of action is exceeded, the springs 9, 10 of the two torsion damping devices 7, 8 are active simultaneously.

One feature of the invention resides broadly in the clutch disc for a friction clutch in a motor vehicle, comprising a hub with internal gearing or toothing for non-rotational fastening to a transmission shaft, a lining holder with friction linings located on both sides, torsion damping devices located actively between the, a first torsion damping device of which is designed for low torques and—viewed in the radial direction—is located relatively close to the hub and consists of at least one input part and at least one output part, which first torsion damping device can be rotated against the force of springs concentrically to a common axis of rotation, and a second torsion damping device which is designed for higher torques and which is actively connected to the first, characterized by the fact that the input part 20, 21 or output part 33, 35 of one of the two torsion damping devices 7, 8 is placed by means of an axial, essentially tubular extension 11–14 on a cylindrical guide diameter D, d of the hub 1–3, which guide diameter is oriented concentrically with the axis of rotation 4.

Another feature of the invention resides broadly in the clutch disc characterized by the fact that the material of the input part 20, 21 or of the output part 33, 35 has a modulus of elasticity which is higher than that of the material of the hub 1–3.

Yet another feature of the invention resides broadly in the clutch disc characterized by the fact that the hub 1–3 is preferably made of plastic.

Still another feature of the invention resides broadly in the clutch disc whereby the second torsion damping device consists of two cover plates or sheets located one on either side of a hub disc, one of which is connected or provided radially outwardly with friction linings, the two cover plate are non-rotationally connected to and held at a distance from one another, and are guided so that they can rotate concentric to the hub, the hub disc is rotationally connected with clearance or play to the hub by means of a gearing, such as external gearing or internal gearing, and the hub disc and cover plates locate springs in apertures, and the first torsion damping device is located axially between the hub disc and a cover plate, and has the cover plate as the input part, with the hub disc as an output part, and has springs, characterized by the fact that the hub disc 33 of the first torsion damping device 7 is permanently connected to the hub 1, has a disc-shaped area with apertures for springs 9, from the inside diameter of which an sleeve-shaped extension 11, 12 extends pointing axially away from the hub disc 22 of the second torsion damping device 8, by means of which it is placed on a cylindrical guide diameter D of the hub 1.

A further feature of the invention resides broadly in the clutch disc characterized by the fact that the hub disc 33 is in contact by means of its disc-shaped area against the one end surface of the external gearing 26 of the hub 1, the hub 1 in this area has axially-projecting lugs 29, 30, 31 which are engaged in corresponding openings 36 in the hub disc 33 circumferentially without clearance.

Another feature of the invention resides broadly in the clutch disc characterized by the fact that the lugs 30 are located in the corner area between the end surface of the external gearing 26 and the guide diameter D of the hub 1, and the openings 36 in the hub disc 33 start from the disc-shaped area and proceed in the form of slots 15 which run axially over the entire length of the extension 12.

Yet another feature of the invention resides broadly in the clutch disc characterized by the fact that the lugs 29, 31 are located radially outward from the extension 11 and with their ends form a—circumferentially discontinuous—stop, or contact, and friction surface 38 for the cover plate 17 of the second torsion damping device 8 which faces these end surfaces.

Still another feature of the invention resides broadly in the clutch disc characterized by the fact that on the end surface of the external gearing 26 of the hub 1 opposite the end surfaces of the extension 11, an axially acting spring 39 is supported, which acts on the cover plate 16 of the same side.

A further feature of the invention resides broadly in the clutch disc characterized by the fact that the one cover plate 16 of the second torsion damping device 8, on the side of the external gearing 26 facing away from the extension 12 of the hub disc 33 of the first torsion damping device 7, is placed by means of an integral, axial and essentially tubular extension 14 on a cylindrical guide diameter d of the hub 1 oriented concentrically to the axis of rotation 4.

Another feature of the invention resides broadly in the clutch disc characterized by the fact that the cover plate 16 of the second torsion damping device 8, which cover plate 16 extends essentially radially on the side of the extension 11, is provided in its radially inner area with a bearing element 37, which is guided by means of its inside diameter on the outside diameter of the extension 11.

Yet another feature of the invention resides broadly in the clutch disc as claimed whereby the second torsion damping device consists of two cover plates located one on either side of a hub disc, one of which is connected radially outside with friction linings, the two cover plates are non-rotationally connected to and held at a distance from one another and are guided rotationally concentric to the hub, between the two of which there is a hub disc which is rotationally connected to the hub by means of gearing (external gearing, internal gearing) with clearance, and the hub disc and cover plates locate springs in apertures, and the first torsion damping device is located essentially centrally in relation to the hub disc of the second torsion damping device, such that the springs of the first torsion damping device are located in the vicinity of the gearing between the hub disc and the hub, and on both sides of the toothed area there are cover plates as output parts for the actuation of the springs, characterized by the fact that the hub 2 in the vicinity of the gearing 25 is provided with teeth 28 which point radially outward of an external gearing 26, which teeth 28 are narrower than the diameter of the springs 9 of the first torsion damping device 7, cover plates 35 on both sides of the teeth 28 there are cover plates 35 with a disc-shaped portion for the springs 9 non-rotationally fastened to the hub 2, which cover plates 35 have apertures 40 directed axially toward the springs 9, in which apertures 40 the springs 9 are engaged, and from the inside diameter of at least one of the disc-shaped areas, a sleeve-shaped extension 13 extends, which extends away from the toothed portion 25 and is placed on a cylindrical guide diameter D of the hub 2.

Still another feature of the invention resides broadly in the clutch disc characterized by the fact that each cover plate 35 is provided with a sleeve-shaped extension 13.

A further feature of the invention resides broadly in the clutch disc characterized by the fact that the teeth 28 are provided with axially projecting lugs 29 which are engaged in corresponding openings 36 of the disc-shaped areas of the cover plates 35 without circumferential clearance.

Another feature of the invention resides broadly in the clutch disc characterized by the fact that the lugs 29 are located radially outward from the springs 9.

Yet another feature of the invention resides broadly in the clutch disc characterized by the fact that the radially inward portions of both cover plates 18, 19 of the second torsion damping device 8 end on the side of the disc-shaped areas of the cover plates 35 of the second torsion damping device 8 facing away from the teeth 28 of the hub 2, and at least one 18 of them is guided by means of a bearing element 41 on the outside diameter of a sleeve-like projection 13 of a cover plate 35.

Still another feature of the invention resides broadly in the clutch disc characterized by the fact that the bearing element 41 is in contact by means of a surface 42 which is directed axially on the disc-shaped area of the corresponding cover plate 35 of the first torsion damping device 7, and an axially acting spring 39 is located on the opposite side between the other cover plate 19 of the second torsion damping device 8 and the disc-shaped area of the cover plate 35 of the first torsion damping device 7.

A further feature of the invention resides broadly in the clutch disc whereby the second torsion damping device consists of two cover plates located one on either side of a hub disc, one of which is connected radially outwardly to friction linings, the two cover plates are non-rotationally connected to and held at a distance from one another, and are guided so that they can rotate concentrically to the hub, and between the two cover plates there is a hub disc which is rotationally connected to the hub by means of gearing without play, and the hub disc and cover plates locate springs in apertures and the first torsion damping device is oriented essentially centrally in relation to the hub disc of the second torsion damping device, such that the springs of the first torsion damping device are located essentially radially outside the gearing of the hub disc and hub, and on both sides of the gearing there are cover plates for the actuation of the springs, characterized by the fact that the cover plates of the first torsion damping device 7 are made in one piece with the cover plates 20, 21 of the second torsion damping device 8, such that the cover plates 20, 21 have, in addition to the apertures for the springs 10 of the second torsion damping device 8, additional apertures 40 which are designed for the actuation of the springs 9 of the first torsion damping device 7, and at least one of the cover plates 21 radially inward from the apertures 40 is provided with an integral sleeve-shaped extension 14 which points away from the gearing 25 and by means of which it is guided on a guide diameter d of the hub 3.

Another feature of the invention resides broadly in the clutch disc characterized by the fact that the cover plate 20 is supported approximately in the area of the diameter of the extension 14 axially on the external gearing 26 of the hub 3, and on the opposite side of the other cover plate 21, it is pushed away from the gearing 25 by the interposition of an axially-acting spring 39 between the external gearing 26 and the inside of the cover plate 21.

Examples of springs, such as "zig-zag" springs, which may be utilized in accordance with the embodiments of the present invention, may be found in U.S. Pat. No. 4,832,320, which issued to Scowen et al. on May 23, 1989; and U.S. Pat. No. 4,778,404, which issued to Pass on Oct. 18, 1988.

Examples of axially-acting springs, plate-type springs, or plate springs, which may be utilized in accordance with the embodiments of the present invention, may be found in the following U.S. Pat. Nos.: 4,844,226, which issued to Taketani on Jul. 4, 1989; 4,787,492, which issued to Ball et al. on Nov. 29, 1988; 4,704,554, which issued to Nishimura on Nov. 3, 1987; and 4,641,736, which issued to Forster on Feb. 10, 1987.

Examples of torsional vibration dampers, and components associated therewith, which may be utilized in accordance with the embodiments of the present invention, may be found in the following U.S. Pat. Nos.: 4,687,086, which issued to Ward on Aug. 18, 1987; and 4,645,054, which issued to Raab on Feb. 24, 1987.

Examples of clutches, and components associated therewith, which may be utilized in accordance with the embodiments of the present invention, may be found in the following U.S. Pat. Nos.: 5,000,304 to Koch et al.; 4,941,558 to Schraut; 4,854,438 to Weissenberger et al.; 4,741,423 to Hayen; and 4,715,485 to Rostin et al.

Examples of torsional vibration dampers, and components associated therewith, which may be utilized in accordance with the embodiments of the present invention, may be found in the following U.S. Pat. Nos.: 5,016,744, which issued to Fischer et al. on May 21, 1991; 4,433,771, which issued to Caray on Feb. 28, 1984; 4,684,007, which issued to Maucher on Aug. 4, 1987; 4,697,682, which issued to Alas et al. on Oct. 6, 1987; 4,890,712, which issued to Maucher et al. on Jan. 2, 1990; and 4,651,857, which issued to Schraut et al. on Mar. 24, 1987.

Some examples of torsional vibration dampers in which the present invention may be incorporated may be disclosed by the following U.S. Pat. Nos.: 5,230,415 to Ament et al., entitled "Clutch Plate for a Motor Vehicle Friction Clutch"; 5,251,736 to Jeppe et al., entitled "Clutch Plate for a Motor Vehicle Friction Clutch"; 5,238,096 to Ament et al., entitled "Clutch Plate for a Motor Vehicle Friction Clutch"; 4,687,086 to Ward, entitled "Torsional Vibration Dampers"; and 4,787,612 to Ball et al., entitled "Torsional Vibration Damper".

Some examples of transmissions in which the present invention may be incorporated may be disclosed by the following U.S. Pat. Nos.: 5,199,316 to Hoffman, entitled "Fully-Synchronized Multiple Speed Manual Transmission for Motor Vehicles"; 4,458,551 to Winter, entitled "Manual Transmission"; and 3,858,460 to Porter et al., entitled "Four Speed Manual Transmission and Control".

Some examples of clutch assemblies which could possible be used in conjunction with the present invention may be disclosed in the following U.S. Pat. Nos.: 4,684,007 to Maucher, entitled "Clutch Plate"; 4,635,780 to Wiggen, entitled "Clutch Disc for a Motor Vehicle Friction Clutch"; and 4,651,857 to Schraut et al., entitled "Clutch Disc Unit for a Motor Vehicle Clutch".

The appended drawings in their entirety, including all dimension, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign patent publication applications, namely, Federal Republic of Germany Patent Application No. P 44 07 766.1, filed on Mar. 9, 1994, having inventor Reinhard Feldhaus, and DE-OS P 44 07 766.1 and DE-PS P 44 07 766.1, as well as their published equivalents, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. Clutch disc for a motor vehicle clutch, said clutch disc comprising:

a first cover plate;

a second cover plate;

means for substantially fixedly connecting said first and second cover plates with respect to one another;

a hub;

said hub having means for connecting with a transmission of a motor vehicle;

said hub being being oriented concentrically about a rotational axis;

said hub having a length;

the length of said hub being defined generally parallel with the rotational axis;

said hub comprising an inner surface;

said hub comprising an outer peripheral surface;

said outer peripheral surface being disposed substantially further away from the rotational axis than said inner surface;

said outer peripheral having a length;

the length of said outer peripheral surface being defined generally parallel to the rotational axis;

the length of said outer peripheral surface being substantially similar to the length of said hub;

torsional damper means for damping torsional vibrations;

said torsional damper means comprising:
an input portion;
an output portion; and
means for transmitting a torsional force from said input portion to said output portion;

means for stiffening said hub so as to inhibit plastic deformation of said hub;

said stiffening means comprising at least one stiffening portion, said at least one stiffening portion comprising at least a portion of at least one of said input portion and said output portion of said torsional damper means; and said at least one stiffening portion being oriented generally parallel with respect to the rotational axis of said hub;

said at least one stiffening portion comprising at least one essentially tubular member; and said at least one essentially tubular member being in contact with said outer peripheral surface over a substantial portion of the length of said outer peripheral surface.

2. The clutch disc according to claim 1, wherein:

said hub comprises a substantially solid portion; and said substantially solid portion extends between said inner surface and said at least one essentially tubular member.

3. The clutch disc according to claim 2 wherein:

said outer peripheral surface comprises an outer cylindrical surface;

said outer cylindrical surface comprises a cylindrical guide diameter;

said at least one essentially tubular member being disposed on said cylindrical guide diameter;

said hub is formed from a material having a first modulus of elasticity;

said at least one essentially tubular member is formed from a material having a second modulus of elasticity;

said second modulus of elasticity is greater than said first modulus of elasticity.

4. The clutch disc according to claim 3, wherein said hub is formed from plastic.

5. The clutch disc according to claim 4, wherein said torsional damper means comprises one of the following sets of features a) and b):

a) a torsion damping device configured for damping lower torques and, as viewed in a radial direction, being disposed relatively close to said hub, said torsion damping device comprising springs oriented generally concentrically with respect to a rotational axis; and b) first and second torsion damping devices, wherein:

said first torsion damping device is configured for damping lower torques and, as viewed in a radial direction, being disposed relatively close to said hub, said first torsion damping device comprising springs oriented generally concentrically with respect to a rotational axis; and said second torsion damping device is configured for damping higher torques than said first torsion damping device and being actively connected to said first torsion damping device.

6. The clutch disc according to claim 5, further comprising:

the axis of rotation of said hub defining an axial direction;

the axial direction being parallel to the axis of rotation;

said torsional damper means comprising said set of features (b);

said second torsion damping device comprising a hub disc extending radially away from said hub;

said second torsion damping device having two cover plates, said two cover plates comprising said first and second cover plates;

said hub disc being disposed axially between said two cover plates of said second torsion damping device;

one of said two cover plates of said second torsion damping device being connected radially outwardly with friction linings;

said two cover plates of said second torsion damping device being fixedly connected to, and held at a distance from, one another by said means for substantially fixedly connecting;

said two cover plates of said second torsion damping device being guided so as to be concentrically rotatable with respect to said hub;

said hub comprising external gearing;

said hub disc being rotatably disposed on said hub by means of circumferential play at said external gearing of said hub;

said hub disc and said two cover plates of said second torsion damping device locating springs in apertures;

said first torsion damping device being located axially between said hub disc of said second torsion damping device and a cover plate of said second torsion damping device;

said first torsion damping device having at least one cover plate;

said first torsion damping device having a cover plate as an input part, with an additional hub disc as an output part;

said additional hub disc being permanently connected to said hub;

said additional hub disc having a disc-shaped area with apertures for springs;

said at least one essentially tubular member comprising a portion of at least one of: said first cover plate, said second cover plate, and said additional hub disc;

said at least one of said first cover plate, said second cover plate, and said additional hub disc comprising a first side and a second side;

said first side of at least one of said first cover plate, said second cover plate, and said additional hub disc being disposed axially from said second side;

said at least one essentially tubular member comprising said first side of at least one of said first cover plate, said second cover plate, and said additional hub disc;

said second side of at least one of said first cover plate, said second dover plate, and said additional hub disc being disposed axially between said first side and said hub disc of said second torsion means; and said at least one essentially tubular member comprising means for disposing at least one of said first cover plate, said second cover plate, and said additional hub disc on said cylindrical guide diameter.

7. The clutch disc according to claim 6, wherein:

said additional hub disc is in contact, by means of said disc-shaped area, against a radially oriented end surface of said external gearing of said hub; and said hub, in the vicinity of said radially oriented end surface of said external gearing, has axially-projecting lugs which are engaged, without circumferential play, in corresponding openings in said additional hub disc.

8. The clutch disc according to claim 7, wherein:

said clutch disc further comprises a corner region;

said corner region formed between said end surface of said external gearing and said cylindrical guide diameter of the hub;

said lugs are located in said corner region;

said at least one essentially tubular member comprises a portion of said additional hub disc;

said at least one essentially tubular member comprises a length;

the length of said at least one essentially tubular member extending generally parallel to the rotational axis;

said openings in said additional hub disc start in said disc-shaped area, proceed through said corner region, and then take the form of slots which run over the entire axial length of said at least one essentially tubular member.

9. The clutch disc according to claim 7, wherein:

said lugs are located radially outward from said at least one essentially tubular member; and said lugs, with radially oriented end surfaces, form a circumferentially discontinuous axial stop, and friction surface, for that cover plate of said second torsion dampding device which faces these end surfaces.

10. The clutch disc according to claim 9, wherein, on a radially oriented end surface of said external gearing of said hub that is opposite said essentially tubular member, an axially acting spring is supported, wherein this axially acting spring acts on that cover plate of said second torsional damper that is on the same side of said external gearing.

11. The clutch disc according to claim 6, wherein:

said at least one essentially tubular member comprises a first essentially tubular member and a second essentially tubular member;

said second essentially tubular member comprises a portion of at least one cover plate of said second torsion damping device;

said at least one cover plate being disposed on one side of said external gearing;

said first essentially tubular member being disposed on the opposite side of said external gearing from said at least one cover plate; and said second essentially tubular member comprising means for mounting said at least one cover plate on said cylindrical guide diameter of the hub.

12. The clutch disc according to claim 6, wherein:

said at least one essentially tubular member comprises a portion of said additional hub disc;

that cover plate of said second torsion damping device, that extends essentially radially on the side of said external gearing adjacent said essentially tubular member of said additional hub disc, is provided, in its radially inner area, with a bearing element; and said bearing element is guided, by means of an inside diameter of said bearing element, on the outside diameter of said essentially tubular member of said additional hub disc.

13. The clutch disc according to claim 5, further comprising:

the axis of rotation of said hub defining an axial direction;

the axial direction being parallel to the axis of rotation;

said torsional damper means comprising said set of features (b);

said second torsional damping device comprising a hub disc extending radially away from said hub;

said second torsion damping device having two cover plates, said two cover plates comprising said first and second cover plates;

said hub disc being disposed axially between said two cover plates of said second torsion damping device;

one of said two cover plates of said second torsion damping device being connected radially outwardly with friction linings;

said two cover plates of said second torsion damping device being fixedly connected to, and held at a distance from, one another by said means for substantially fixedly connecting;

said two cover plates of said second torsion damping device being guided so as to be concentrically rotatable with respect to said hub;

said hub comprising external gearing;

said hub disc being rotatably disposed on said hub by means of circumferential play at said external gearing of said hub;

said hub disc and said two cover plates of said second torsion damping device locating springs in apertures;

said first torsion damping device is located essentially centrally in relation to said hub disc of said second torsion damping device, such that said springs of said first torsion damping device are located in the vicinity of said external gearing;

said external gearing comprising a toothed portion;

on both sides of said toothed portion, said first torsion damping device comprises cover plates as output parts for the actuation of said springs of said first torsion damping device;

said hub, in the vicinity of said external gearing, is provided with teeth which point radially outward of said external gearing, which teeth have an axial dimension that is less than the diameter of said springs of said first torsion damping device;

on both sides of said teeth, said cover plates of said first torsion damping device each comprise a disc-shaped portion for said springs of said first torsion damping device, each said disc-shaped portion being non-rotatably fastened to said hub;

said cover plates of said first torsion damping device have apertures that open axially toward the springs of said first torsion damping device, wherein said springs of said first torsion damping device are engaged in said apertures;

said at least one essentially tubular member comprising a portion of at least one of said cover plates of said first torsion damping device;

said at least one of said cover plates of said first torsion damping device comprising a first side and a second side;

said first side of at least one of said cover plates of said first torsion damping device being disposed axially from said second side;

said at least one essentially tubular member comprising said first side of at least one of said cover plates of said first torsion damping device;

said second side of at least one of said cover plates of said first torsion damping device being disposed axially between said first side and said toothed portion; and said at least one essentially tubular member comprising a portion of said disk shaped area of at least one of said cover plates of said first torsion damping device.

14. The clutch disc according to claim 13, wherein:

said at least one essentially tubular member comprises ap portion of each of said cover plates of said first torsion damping device.

15. The clutch disc according to claim 14, wherein:

said teeth are provided with axially projecting lugs which are engaged, without circumferential play, in corresponding openings of said disc-shaped areas of said cover plates of said first torsion damping device; and said lugs are located radially outward from said springs of said first torsion damping device.

16. The clutch disc according to claim 13, wherein:

said at least one essentially tubular member comprises an outside diameter;

said outside diameter of said at least one essentially tubular member is disposed substantially further away from the rotational axis than said cylindrical guide diameter;

the radially inward portions of both cover plates of said second torsion damping device end on that side of each disc-shaped area of said cover plates of said first torsion damping device facing away from said teeth of said hub, and at least one of said cover plates of said second torsion damping device is guided by means of a bearing element disposed on said outside diameter of said at least one essentially tubular member.

17. The clutch disc according to claim 16, wherein said bearing element is in contact, by means of a surface which is directed axially, on the disc-shaped area of the corresponding cover plate of said first torsion damping device, and, on the opposite axial side of said external gearing, an axially acting spring is located between the other cover plate of said second torsion damping device and the disc-shaped area of the other cover plate of said first torsion damping device.

18. The clutch disc according to claim 5, further comprising:

the axis of rotation of said hub defining an axial direction;

the axial direction being parallel to the axis of rotation;

said torsional damper comprising said set of features (b);

said second torsion damping device comprises a hub disc extending radially away from said hub;

said first and second cover plates are located on axially opposite sides of said hub disc;

one of said cover plates of is connected radially outwardly with friction linings;

said cover plates are fixedly connected to, and held at a distance from, one another by said means for substantially fixedly connecting;

said cover plates are guided so as to be concentrically rotatable with respect to said hub;

said hub comprising external gearing;

said hub disc being rotatably disposed on said hub by means of circumferential play at said external gearing of said hub;

said hub disc and said cover plates having apertures for locating springs of said second torsion damping device;

said first torsion damping device is oriented essentially centrally in relation to said hub disc of said second torsion damping device, such that said springs of said first torsion damping device are located essentially radially outside said external gearing;

said cover plates further comprise means for actuating said springs of said first torsion damping device, such that said cover plates each serve, in one piece each, as cover plates for both said first torsion damping device and said second torsion damping device;

said at least one essentially tubular member comprising a portion of at least one of said cover plates;

said at least one of said cover plates comprising a first side and a second side;

said first side of said at least one cover plates being disposed axially from said second side;

said at least one essentially tubular member comprising said first side of said at least one cover plates; and said second side of said at least one cover plates being disposed axially between said first side and said external gearing.

19. The clutch disc according to claim 18, wherein;

said essentially tubular member comprises a portion of solely one of said cover plates;

said essentially tubular member comprises a portion disposed at said cylindrical guide diameter;

said one cover plate is axially supported, approximately in the area of said portion of said essentially tubular member disposed at said cylindrical guide diameter, against said external gearing of said hub; and the other cover plate, on the opposite axial side of said external gearing, is pushed away from said external gearing by the interposition of an axially-acting spring acting between said external gearing and the inside of said other cover plate.

* * * * *

UNITED STATES PATENT AND TRADEMARK OFFICE
CERTIFICATE OF CORRECTION

PATENT NO. : 5,588,518
DATED : December 31, 1996
INVENTOR(S) : Reinhard FELDHAUS It is certified that error appears in the above-indentified patent and that said Letters Patent is hereby corrected as shown below:

In column 16, line 65, Claim 9, before 'device', delete "dampding" and insert --damping--.

In column 17, line 40, Claim 13, after 'second', delete "torsional" and insert --torsion--.

In column 18, line 44, Claim 14, after 'comprises', delete "ap" and insert --a--.

In column 19, line 22, Claim 18, after 'plates' delete "of".

Signed and Sealed this

Seventeenth Day of June, 1997

Attest:

BRUCE LEHMAN

*Attesting Officer*     *Commissioner of Patents and Trademarks*